US007487024B2

(12) United States Patent
Farley et al.

(10) Patent No.: US 7,487,024 B2
(45) Date of Patent: Feb. 3, 2009

(54) APPARATUS AND METHOD FOR AUTOMATICALLY SETTING OPERATING PARAMETERS FOR A REMOTELY ADJUSTABLE SPREADER OF AN AGRICULTURAL HARVESTING MACHINE

(75) Inventors: Herbert M. Farley, Elizabethtown, PA (US); Nathan E. Isaac, Leola, PA (US); Andrew V. Lauwers, Stevens, PA (US); Jason M. Benes, Grand Island, NE (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 11/796,055

(22) Filed: Apr. 26, 2007

(65) Prior Publication Data

US 2008/0268927 A1 Oct. 30, 2008

(51) Int. Cl.
*G06F 7/70* (2006.01)
*G06F 19/00* (2006.01)
*G06G 7/00* (2006.01)
*G06G 7/76* (2006.01)

(52) U.S. Cl. ...................................... 701/50
(58) Field of Classification Search ................. 701/50; 56/10.2 R; 239/675, 63, 67, 155, 677; 222/23, 222/283, 624, 626; 460/112, 111, 901
See application file for complete search history.

(56) References Cited

U.S. PATENT DOCUMENTS

| | | | |
|---|---|---|---|
| 3,677,540 A | 7/1972 | Weiss | 222/23 |
| 3,679,098 A | 7/1972 | Weiss | 222/23 |
| 3,792,709 A | 2/1974 | Johnson, Jr. et al. | 137/47 |
| 4,230,280 A | 10/1980 | Leigh et al. | 239/677 |
| 4,383,536 A * | 5/1983 | Delorme | 460/1 |
| 5,569,081 A | 10/1996 | Baumgarten et al. | 460/112 |
| 6,092,745 A | 7/2000 | Seymour et al. | 239/675 |
| 6,331,142 B1 | 12/2001 | Bischoff | 460/112 |
| 6,397,571 B1 | 6/2002 | Ehrecke | 56/10.2 R |
| 6,729,953 B2 | 5/2004 | Bueermann | 460/112 |

(Continued)

FOREIGN PATENT DOCUMENTS

DE 3938147 6/1991

(Continued)

*Primary Examiner*—Árpád Fábián-Kovács
(74) *Attorney, Agent, or Firm*—Michael C. Harms; John William Stader; Patrick M. Sheldrake

(57) ABSTRACT

Apparatus and a method for automatically recognizing a header connected to a harvesting machine and setting operating and/or adjustment parameters of a spreader of the machine for use with the header. The apparatus includes a memory containing information representative of predetermined spreader settings for at least one header connectable to the harvesting machine, such as a grain header and a corn or maize header. A detector element is operable for automatically identifying a header connected to the machine and outputting a signal or information representative thereof, to a controller automatically operable for using that information for retrieving the stored information representative of the predetermined spreader settings for that header. Input commands and/or information, for instance, relating to crop type, and/or crop and environmental conditions, can also be inputted using either an onboard or remote input device. The controller then responsively controls a crop residue spreader connected to the machine as a function of the retrieved information and any inputted commands or information, if within predetermined permissible ranges.

15 Claims, 8 Drawing Sheets

U.S. PATENT DOCUMENTS

| | | |
|---|---|---|
| 6,783,454 B2 | 8/2004 | Bueermann .................. 460/112 |
| 2004/0029624 A1* | 2/2004 | Weichholdt .................. 460/112 |
| 2005/0150202 A1 | 7/2005 | Quick ..................... 56/10.2 R |
| 2006/0042211 A1* | 3/2006 | Heinsey et al. ............. 56/10.2 J |
| 2006/0189362 A1 | 8/2006 | Niermann et al. ........... 460/111 |
| 2007/0214760 A1* | 9/2007 | Bomleny et al. .......... 56/10.2 E |

FOREIGN PATENT DOCUMENTS

EP 0609657 1/1994

* cited by examiner

APPARATUS AND METHOD FOR AUTOMATICALLY SETTING OPERATING PARAMETERS FOR A REMOTELY ADJUSTABLE SPREADER OF AN AGRICULTURAL HARVESTING MACHINE

TECHNICAL FIELD

This invention relates generally to apparatus and a method for automatically setting operating parameters of spreader apparatus of an agricultural harvesting machine such as a combine, and more particularly, to apparatus and a method for automatically detecting connection of a header to the machine, recognizing the header type, retrieving stored operating settings for the header, and applying the settings for remotely adjusting the spreader. The invention can also be configured for automatically adjusting the spreader settings for environmental conditions, such as wind, and other conditions.

BACKGROUND ART

Currently, agricultural harvesting machines such as combines typically include a spreader for propelling crop residue onto a harvested field, which will typically include stalks, leaves and cobs separated from corn or maize; straw and chaff separated from wheat and other grasses; and stalks, leaves and pods of legumes such as soybeans. In many instances it is desirable for the crop residue to be spread as evenly as possible over the width of the harvested swath, to avoid problems resulting from uneven spreading, such as, but not limited to, difficulty in passage of fall tillage tools through residue clumps or thick areas; uneven insulation of the field resulting in uneven field warming and thawing and weed or crop emergence during the following planting season; and increased rodent and insect habitat. Some spreaders can also have a capability for chopping the crop residue. Accordingly, the term chopper as used herein can refer to devices having a spreading capability only, as well as those having both a spreading and a chopping capability.

It is known to provide apparatus, such as, but not limited to, spreader boards, distributors, and deflectors which are adjustable and/or movable and/or changeable, for variably or adjustably controlling and/or guiding airborne flight of the crop residue from the spreader for distribution over a field. It is also known to vary the rotational speed of impellers of a spreader, either alone or in association with other apparatus adjustments, for effecting changes in crop residue flight and distribution, for instance, to provide a distribution pattern having a particular sideward extent or width, typically closely equal to the width of a harvested swath of a field. Reference in this regard, Baumgarten et al. U.S. Pat. No. 5,569,081; and Bischoff U.S. Pat. No. 6,331,142. More recently, it is known to provide a capability to control or adjust these parameters remotely, for instance, using an operator switch in the operator cab of the machine, or automatically using a suitable control. Reference in this regard, U.S. Pat. No. 5,569,081, which attempts to overcome this problem using a multiple linkage arrangement involving servomotor controls for controlling the positions of guiding plates or vanes of the spreader for making adjustments to compensate for wind. Automatic directional control is addressed in Bueermann U.S. Pat. No. 6,729,953, which also uses a complex linkage arrangement for this purpose. Reference also, Niermann et al. U.S. Patent Publication US 2006/0189362.

Combine headers having a width of 20 to 30 feet are currently well known, and headers having widths of 36 to 40 feet are also known. Such headers of different widths are commonly used interchangeably with a single combine. For instance, the owner or operator of a combine may have a grain header which is used for harvesting smaller grains such as wheat and soybeans, and a corn header for harvesting corn or maize. These headers can be of different widths, and thus will harvest correspondingly different width swaths of a field. The difference between the crops, and other conditions, e.g., moisture content and wind, will also effect different flight and/or distribution characteristics of the crop residue. As a result, the adjustable parameters of a spreader must be set for the header to be used, as well as for the crop to be harvested and the current conditions of the crop and other variables such as weather. A problem that has been encountered, however, is that sometimes the operator does not set the spreader for a newly connected header, or does so improperly or imprecisely, resulting in poor crop distribution and dissatisfaction.

Still further, it has been found that crop spreading conditions can vary over the course of a harvesting operation. For instance, crop population can vary; and crop residue distribution and location can change as a result of winds, particularly cross winds, changes in the direction of travel, varying contours of a field or obstacles therein that require following curved swaths, and turning, such as in the headlands of a field. Typically, when cross wind conditions are present, the sideward alignment of a pattern of crop residue deposition will have to be adjusted from time to time, such as when harvesting machine and or wind changes direction and/or speed. Additionally, it may be desirable to adjust the spreader settings for other purposes, for instance, to avoid discharge of crop material onto areas bounding a field, such as a road or the like.

Thus, what is sought is apparatus and a method and apparatus for automatically recognizing a header connected to a harvesting machine and setting operating and adjustment parameters of a spreader for use therewith, which accommodates use with different crops, and changing conditions, and otherwise improves crop residue spreading and distribution, and which avoids one or more shortcomings and problems of the prior art devices.

SUMMARY OF THE INVENTION

What is disclosed is apparatus and a method for automatically recognizing a header connected to a harvesting machine and setting operating and adjustment parameters of a spreader for use therewith, which accommodates use with different crops, for improving crop residue spreading and distribution, and which avoids one or more shortcomings and problems of the prior art devices set forth above.

According to a preferred aspect of the invention, the apparatus includes a memory containing information representative of predetermined spreader settings for at least one header connectable to the harvesting machine, and more preferably, at least two headers, such as, but not limited to, a grain header and a corn or maize header. The apparatus includes a detector element operable for automatically identifying a header connected to the machine and outputting a signal or information representative thereof, and a controller automatically operable for receiving the signal or information outputted by the detector element and retrieving the information representative of the predetermined spreader settings for the header connected to the machine from the memory, and responsively controlling a crop residue spreader connected to the machine as a function of the retrieved information.

According to another preferred aspect of the invention, a crop residue spreader connected to the machine includes at least one actuator or control device controllably operable for adjusting a setting or parameter of the spreader, the controller being connected in operative control thereof and operable for responsively controlling the actuator as a function of the retrieved information. Examples of settable parameters can include, but are not limited to, position or angle of one or more distributors or guides, a spreader board, and/or vanes thereof, and a speed of rotation of one or more impellers.

According to another preferred aspect of the invention, the apparatus includes one or more input devices connected to the controller, which inputs can include an operator input device usable by an operator for inputting commands thereto for adjusting the spreader setting or settings previously automatically set by the operator. Other input devices can include, for instance, environmental input devices such as a wind speed sensor and a wind direction sensor, operable for sensing and inputting information or commands to the controller representative of pertinent wind conditions. Still other input devices can include remote input devices. Examples of this may include environmental data such as available in the United States from the National Weather Service via radio frequency, a local or on-site weather base station, a signal sent via satellite, such as used for GPS guidance, and/or geographic data (e.g. locations of roads and other boundaries) from a geographic information system (GIS) data source available external to the machine. In this latter regard, the GIS data source could give the relative proximity of the machine to a road onto which it is not desired to discharge material, and the controller could automatically limit the spread width on that side of the machine. Preferably, the controller is programmed for automatically comparing values of the inputted information and/or commands to at least one predetermined limit therefor, and adjusting the spreader as a function of the inputted commands only when the values are within the at least one limit. In this regard, the memory can include stored information for a particular header and crop type with maxima and minima limits not to be exceeded. The controller is also preferably programmed to automatically store a value in the memory representative of at least a last of the inputted commands, and then to subsequently automatically adjust the spreader to the last command, such as when the spreader and/or the harvesting machine has been turned off and is restarted.

As a result, using the present invention, the spreader setting or settings will be automatically matched to a header connected to a harvesting machine, and can be modified for a particular crop and/or other conditions, for instance, moisture content, wind speed, wind direction, etc., so as to be closely set to a swath to be harvested thereby, and such that subsequent operator adjustments, and automatic adjustments for environmental conditions, e.g., wind, and inputted commands, if any, can be relatively minor, for instance, for adjusting more exactly to a swath width, or for changes in wind drift, or other conditions, and/or presence of geographic features such as adjacent roads or other boundaries, and any such adjustments can be automatically saved, for use during subsequent operation.

DETAILED DESCRIPTION OF THE INVENTION

Figure 1:
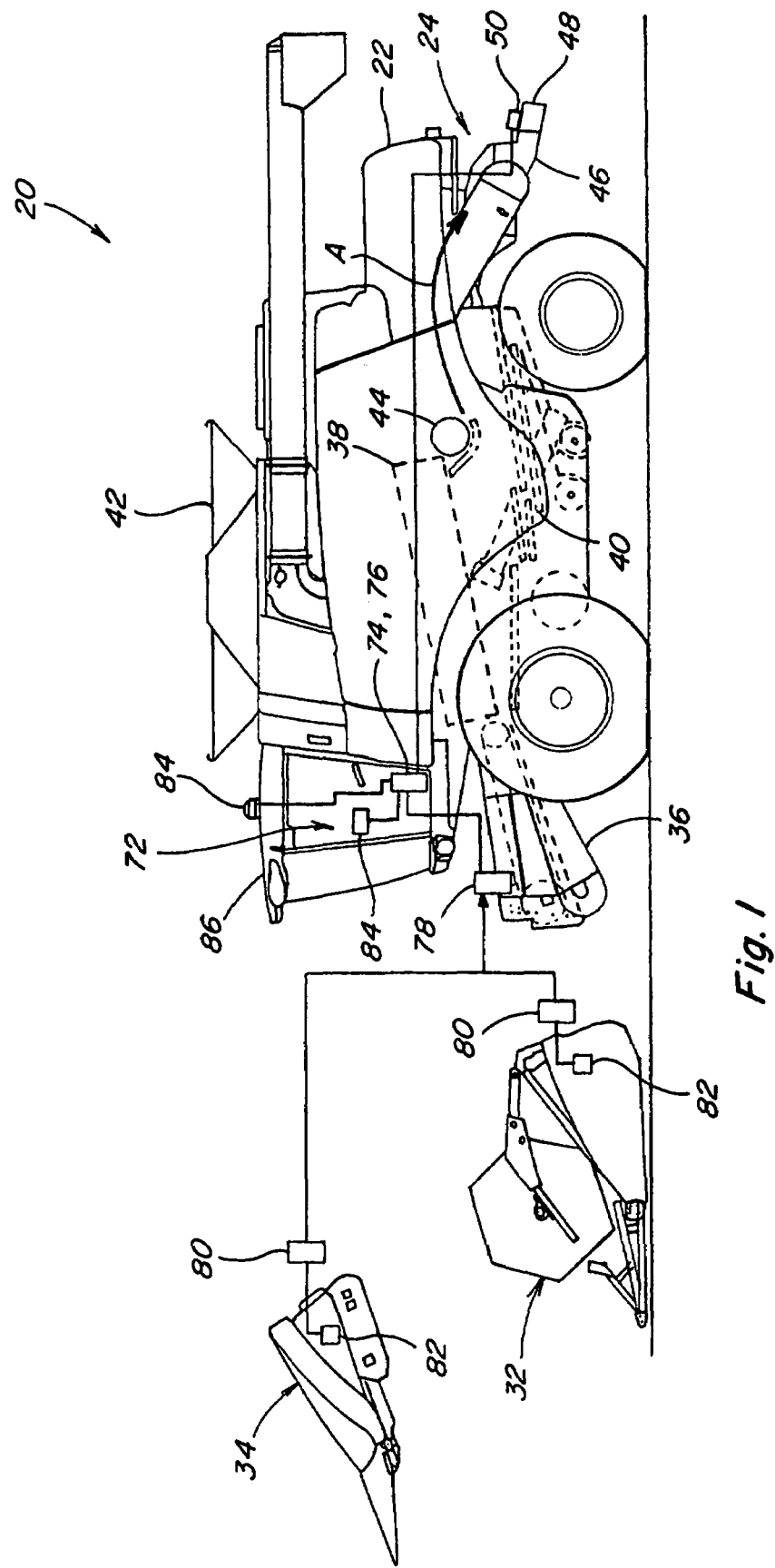
FIG. 1 is a simplified, side view of an agricultural combine including one embodiment of an adjustable crop residue spreader in connection with apparatus for controlling settings thereof according to the present invention, and showing representative headers alternatively connectable to the combine.
Figure 2:
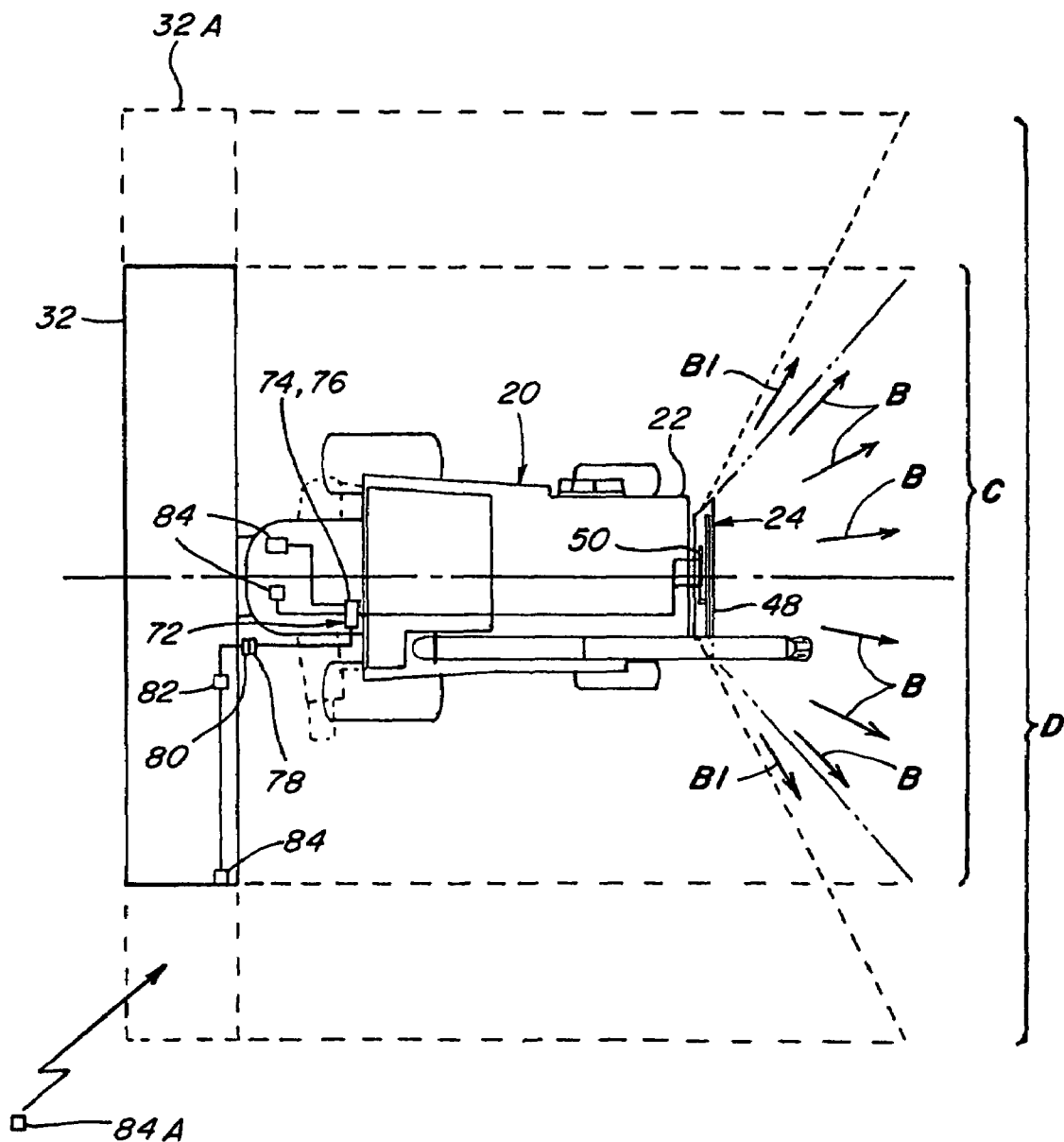
FIG. 2 is a simplified schematic top view of a combine, showing a header connected thereto, and illustrating in dotted lines an alternative width of the header, and alternative spreader discharge patterns possible using the apparatus and method of the invention.

Referring now to the drawings, wherein aspects of preferred embodiments of the present invention are shown, in FIGS. 1 and 2, a self-propelled agricultural combine 20 is shown, including a rear end 22 having a crop residue spreader 24 mounted thereon in the conventional manner, and operable for propelling a flow of crop residue therefrom, for deposition in a desired pattern over a field, as automatically set and/or adjusted by apparatus 26 and a method of the present invention. Spreader 24 is intended to be representative of a wide variety of spreaders with which apparatus 26 can be used, including what are commonly referred to as horizontal spreaders, chopper/spreaders (spreader 24 of FIGS. 1, 2, 2A, 2B and 3), and vertical spreaders (spreader 28 of FIGS. 3A and 3B), each of which includes one or more drivingly rotatable drivers or impellers, as illustrated by rotating flails 66 in FIGS. 2A and 2B, and by counter rotating impellers 30 of spreader 28 (denoted schematically by circles and opposing arrows in FIG. 3A, and shown in FIG. 3B) into which a flow of crop residue (downward arrows in FIG. 3B) is continually fed and which accelerates and discharges the crop residue either rearwardly (FIGS. 2 and 3) or sidewardly (large arrows in FIGS. 3A and 3B) so as to be deposited over a field in a desired pattern, as is well known.

A combine, as represented by combine 20, will include apparatus for harvesting crops from which the crop residue is produced, which harvesting apparatus will typically be a header, such as header 32 shown in FIG. 1, which is commonly referred to as a grain header and is typically utilized for harvesting smaller grains, such as, but not limited to, wheat and soybeans. Headers such as header 32 used for this purpose can have a variety of widths, for instance, from about 20 to about 40 feet, as is well known. Another well known header 34 is shown, which is a corn header, and will typically be of a 6, 8, 12 or 16 row variety, and will have an overall width of from about 20 to about 43 feet. Headers 32 and 34, as well as other headers (not shown), are configured to be interchangeably mounted on the front end of a feeder 36 of combine 20 in the well-known, conventional manner, for configuring combine 20 for harvesting a particular crop.

Briefly, the crops harvested by a header, such as header 32 or header 34, will be gathered up by the header and conveyed by feeder 36 rearwardly and upwardly into the body of combine 20, for processing by a threshing system 38. System 38 is operable for threshing and separating grain from larger elements of crop material, such as stems, leaves, cobs and larger fragments of pods, such that the grain will fall to a cleaning system 40, which will further process or clean smaller elements of crop residue from the grain, and the grain will be conveyed to a grain tank 42 or other collector. The larger elements of crop material will be propelled rearwardly through a rear end of the body of combine 20 by a rapidly rotating beater 44, and into an inlet opening of the spreader, as generally denoted by arrow A, in FIG. 1, and arrows A in FIG. 3B.

Figure 2A:
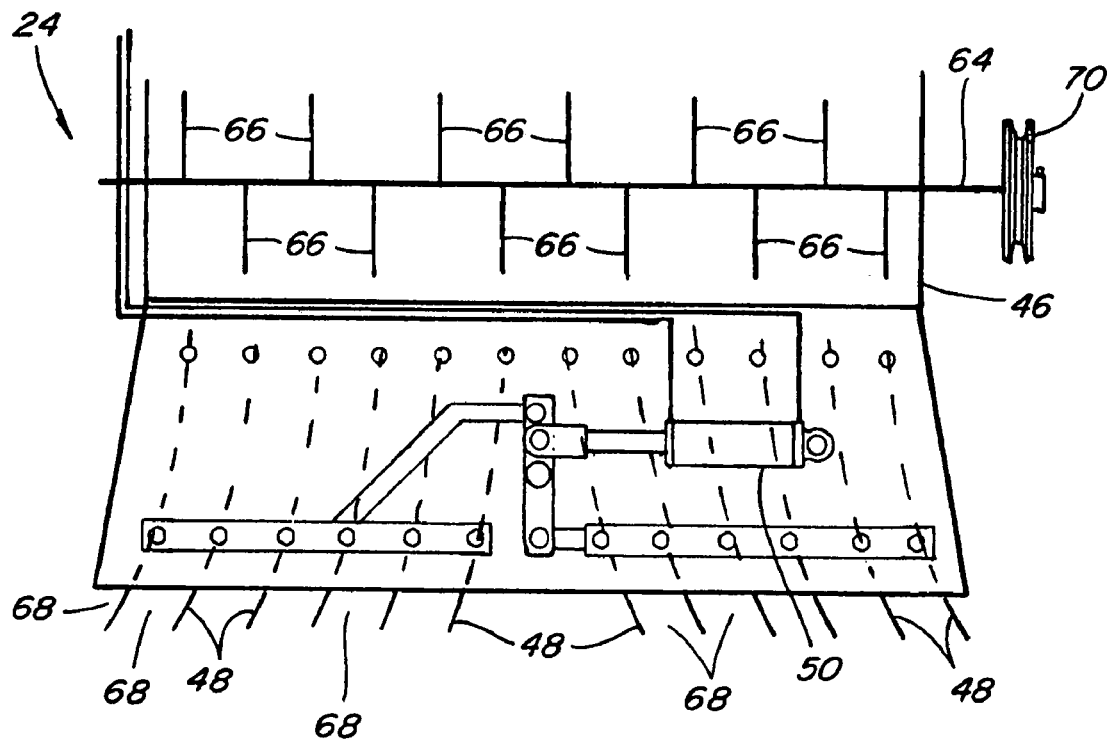
FIG. 2A is a simplified schematic top view of a spreader of the type shown in FIG. 1, illustrating one representative apparatus remotely controllable for adjusting the positions of adjustable vanes thereof.
Figure 2B:
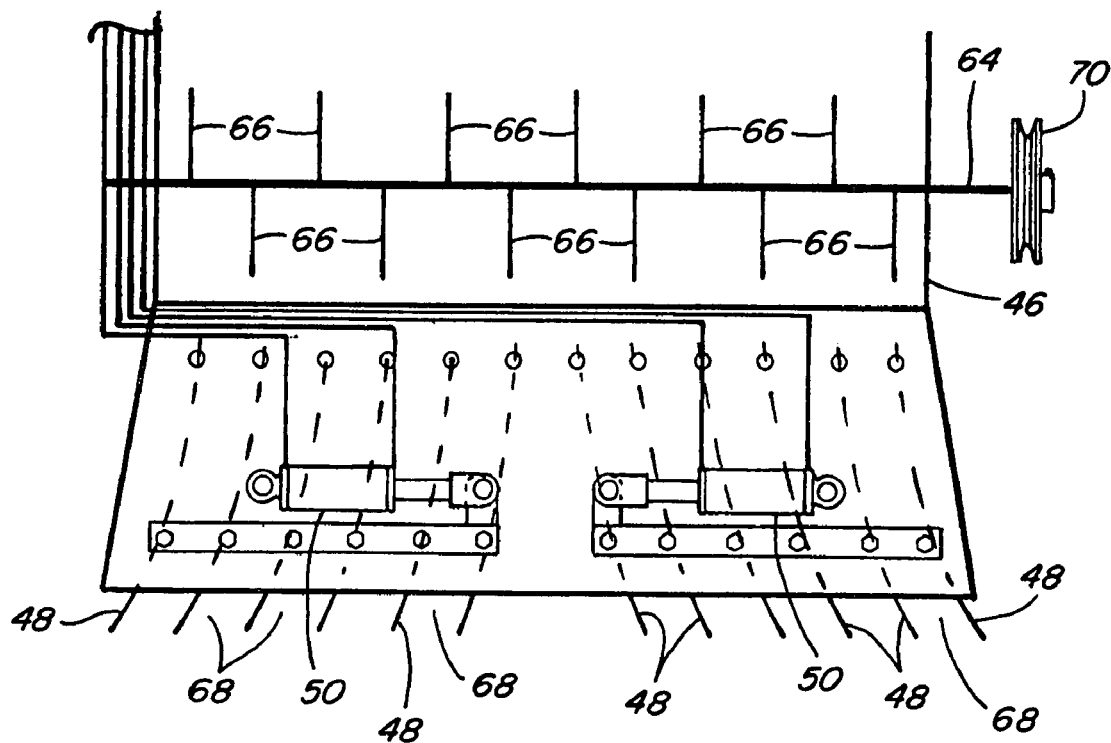
FIG. 2B is a simplified schematic top view of a spreader of the type shown in FIG. 2A, illustrating an alternative apparatus remotely controllable for adjusting the positions of adjustable vanes thereof.

Addressing spreader 24 in particular, that spreader is operable for propelling the crop residue rearwardly therefrom, as denoted by arrows B and B1, as guided or directed by vanes 48 on a spreader board extending rearwardly from housing 46 across the width thereof, as is well known. Housing 46 can also optionally contain a plurality of fixed knives or bars (not shown) against which the crop residue is propelled, so as to be chopped, although the knives or bars can be removed, retracted or deleted such the crop residue will be propelled from spreader 24 unchopped, all in the well known manner. As shown in FIGS. 2A and 2B, the positions or orientations of vanes 48 are adjustable or settable by an actuator 50 or actuators 50 for determining a width of a pattern of deposition of the crop material on a field. Actuator 50 can be a linear actuator or actuators, such as, but not limited to, a fluid cylinder or an electric linear actuator, a rotary actuator, or any other suitable type actuator of well known construction and operation. For the actuators 50 shown, the width of the pattern of deposition would be increased by the extending or lengthening of the actuator, and decreased by retraction.

Figure 3:
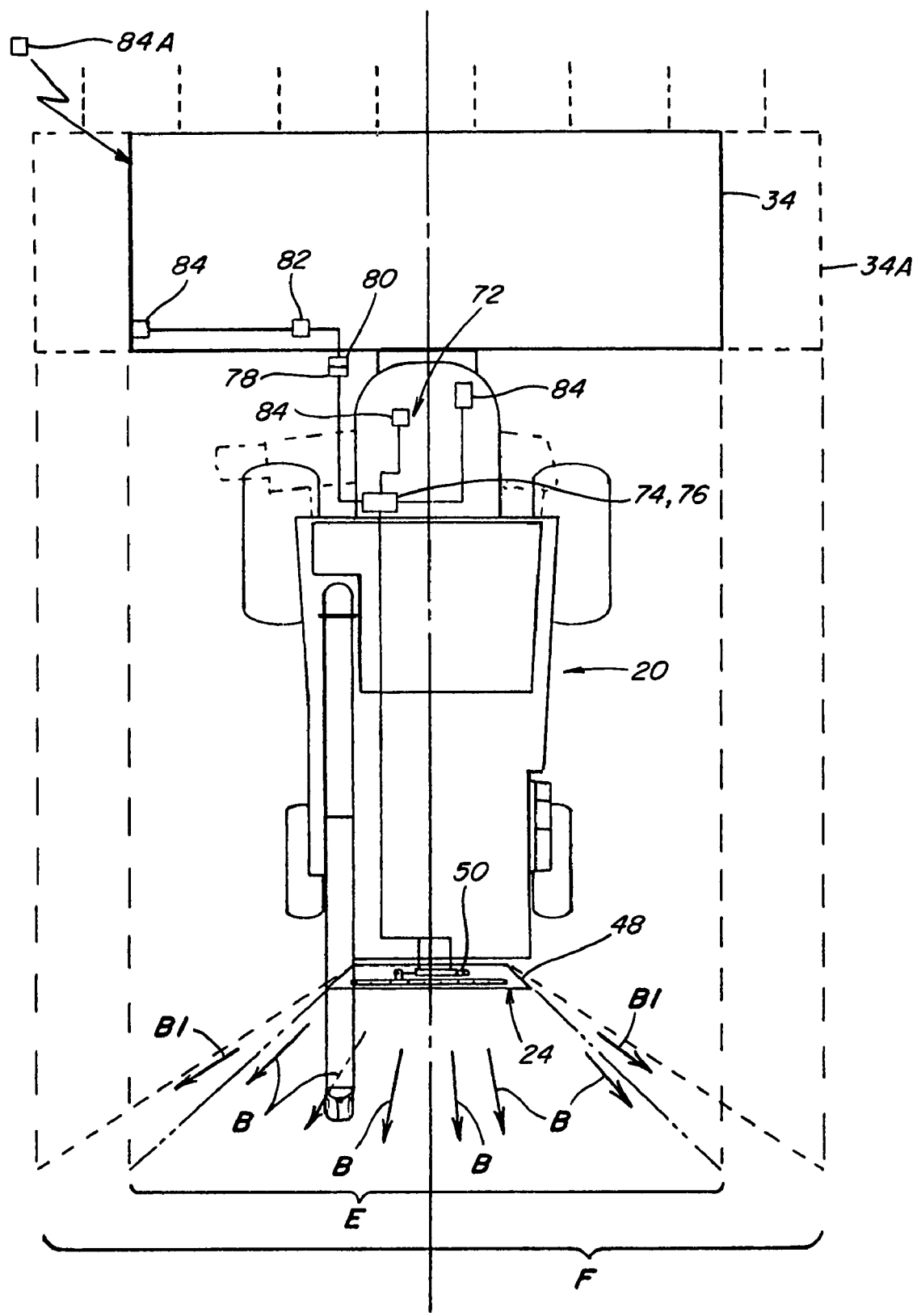
FIG. 3 is simplified schematic top view of a combine, showing another header connected thereto, and illustrating in dotted lines an alternative width of the header, and alternative spreader discharge patterns possible using the apparatus and method of the invention.

Two crop residue deposition pattern widths C and D are illustrated in FIG. 2, and two other widths E and F are illustrated in FIG. 3. Widths C and E are achieved by a setting that produces crop discharges B only, and widths D and F are achieved with a wider setting that produces crop discharges B and also B1. In FIG. 2, a smaller width pattern such as width C would be used with a smaller width header, such as header 32, and a wider pattern such as width D would be used with a wider header, such as depicted by header 32A. In FIG. 3, a smaller width pattern E would be used with a smaller width header, such as header 34, and a wider pattern F would be used with a wider header 34A. In any instance, it is typically desired that the width of the pattern of crop residue deposition or distribution substantially equal the header width. However, as noted above, a problem that can occur is that an operator will inadvertently or otherwise fail to adjust the spreader width setting or settings, or will do so improperly, such that the header width is not matched. The present invention has utility for overcoming this problem, as will be explained below. Additionally, from time to time, conditions, which can include, but are not limited to, environmental conditions such as wind direction and/or speed, will change or vary, or special geographical features, such as roads or other boundaries will be present, and for which it will be desirable to automatically adjust the spread width, on one or both sides of the combine. The present invention has utility for accommodating this, as also explained below.

Figure 3A:
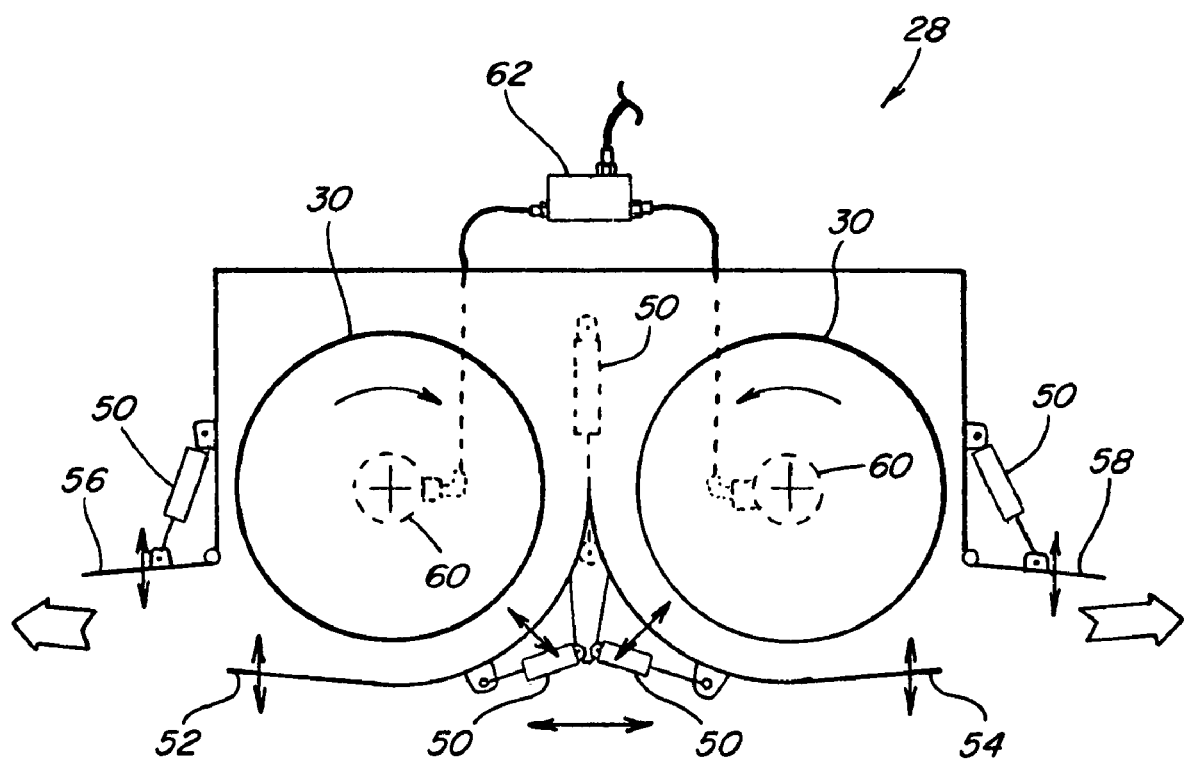
FIG. 3A is a simplified schematic end view of another embodiment of a remotely adjustable crop residue spreader for a combine, and including arrows illustrating possible adjustable parameters of the spreader.
Figure 3B:
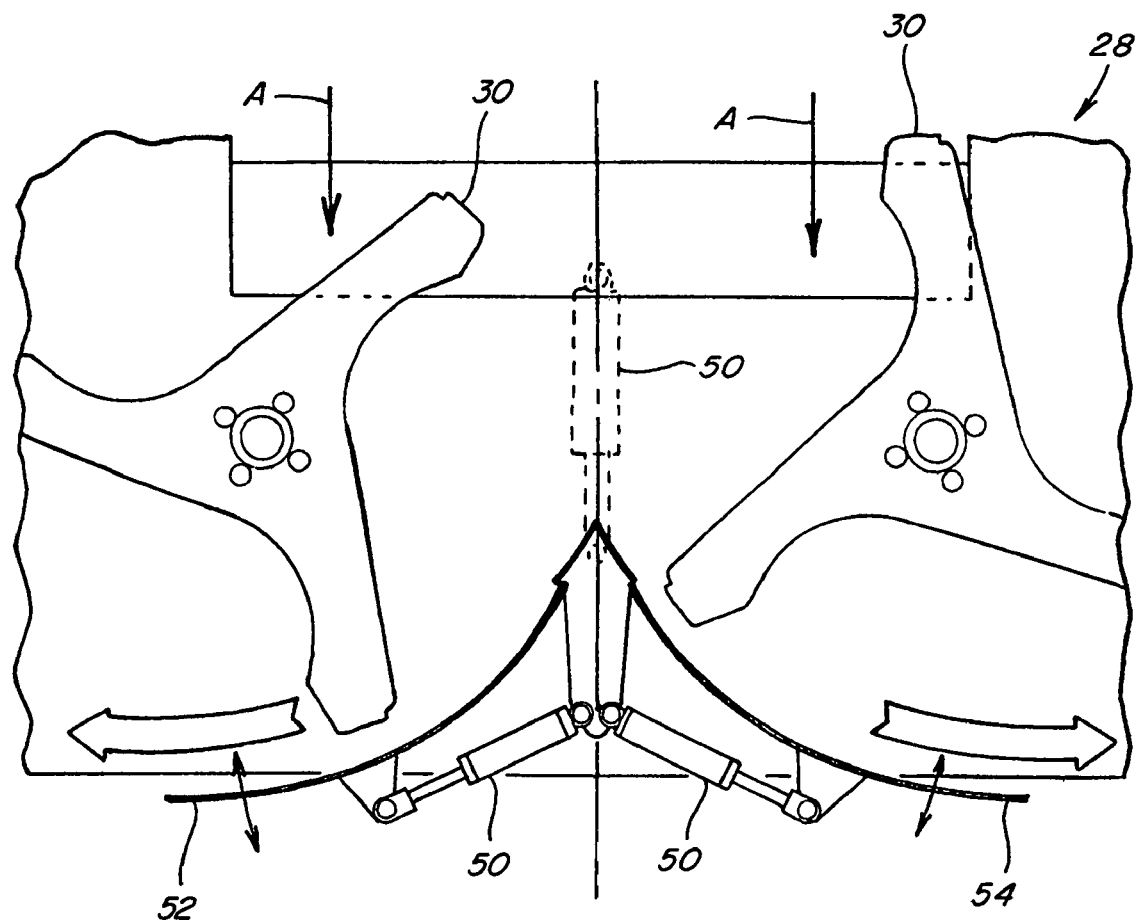
FIG. 3B is a simplified front view of the spreader of FIG. 3A, illustrating a possible actuator configuration operable for effecting settings of the spreader according to the invention.

Referring to FIGS. 3A and 3B, spreader 28 differs from spreader 24 in that it includes a pair of curved distributors 52 and 54 below counter rotating impellers 30, and a pair of upper guides 56 and 58, each distributor 52 and 54, and guide 56 and 58, preferably being movable in at least one way through a range of positions, as denoted by any of the associated arrows, for effecting changes in crop residue flow and deposition on a field, for instance, for achieving a crop residue deposition having a width C, D, E or F. Again, suitable actuators can be provided for achieving a desired position, such as actuators 50 illustrated. Impellers 30 of spreader 28 are drivingly rotated by a suitable drive, such as motors 60, which can be, for instance, fluid or electric motors, controlled by a control device 62. Control device 62 can include, for instance, one or more remotely controllable fluid control valves, or electric motor controllers, or a suitable belt drive, as desired or required for a particular application, controllable for varying a speed of rotation of the impeller or impellers, for changing one or more parameters of crop discharge from the spreader, such as the width of a pattern of deposition of crop residue on a field, as denoted by widths C, D, E and F. Briefly referring again to FIGS. 2A and 2B, housing 46 of spreader 24 supports a rotary shaft 64 supporting a plurality of knives or flails 66 for rotation therewith, for propelling crop residue received from cleaning system 40, rearwardly through channels 68 defined between vanes 48, as is well known. Shaft 64 can be directly driven, for instance, by a fluid or electric motor (not shown), or indirectly, such as by a belt which encircles a sheave 70 on shaft 64, and another sheave on another shaft or a motor (not shown). The speed of rotation of shaft 64 will also be controlled by a suitable control device (not shown) which can include, for instance, a motor controller, a clutch, and/or a transmission. Here, it should be noted that it is contemplated that the apparatus and method of the invention can be utilized with a variety of spreaders and control devices controllably operable for setting an operating speed of rotary aspects of the spreader.

Addressing environmental conditions, under no or low wind conditions, aligning the sideward position or location of the pattern of crop residue deposition relative to a swath through a field can be a simple matter of making appropriate ones of the adjustments discussed above, symmetrically about a forwardly and rearwardly extending centerline of combine 20. However, when wind conditions are sufficient for affecting the location of crop residue deposition, for instance when blowing sidewardly, and/or frequently changing, some adjustments will likely be necessary to maintain or achieve the desired alignment with the swath. There may also be internal conditions which require this, such as infeeding of a greater amount of crop material to one side of the spreader or the other. Adjustments may also be required when turning and changing direction. Thus it is contemplated that actuator or actuators 50, and control device or devices 62, as applicable, can optionally be suitably controllable for providing a capability for making asymmetrical adjustments to accommodate such requirements. For instance, the speeds of motors 60 may be adjusted differently, and/or one or more of the distributors, deflectors or vanes on one side of the spreader may be adjusted differently than its counterpart on the other side of the spreader, to provide desired distribution and alignment characteristics.

Figure 4:
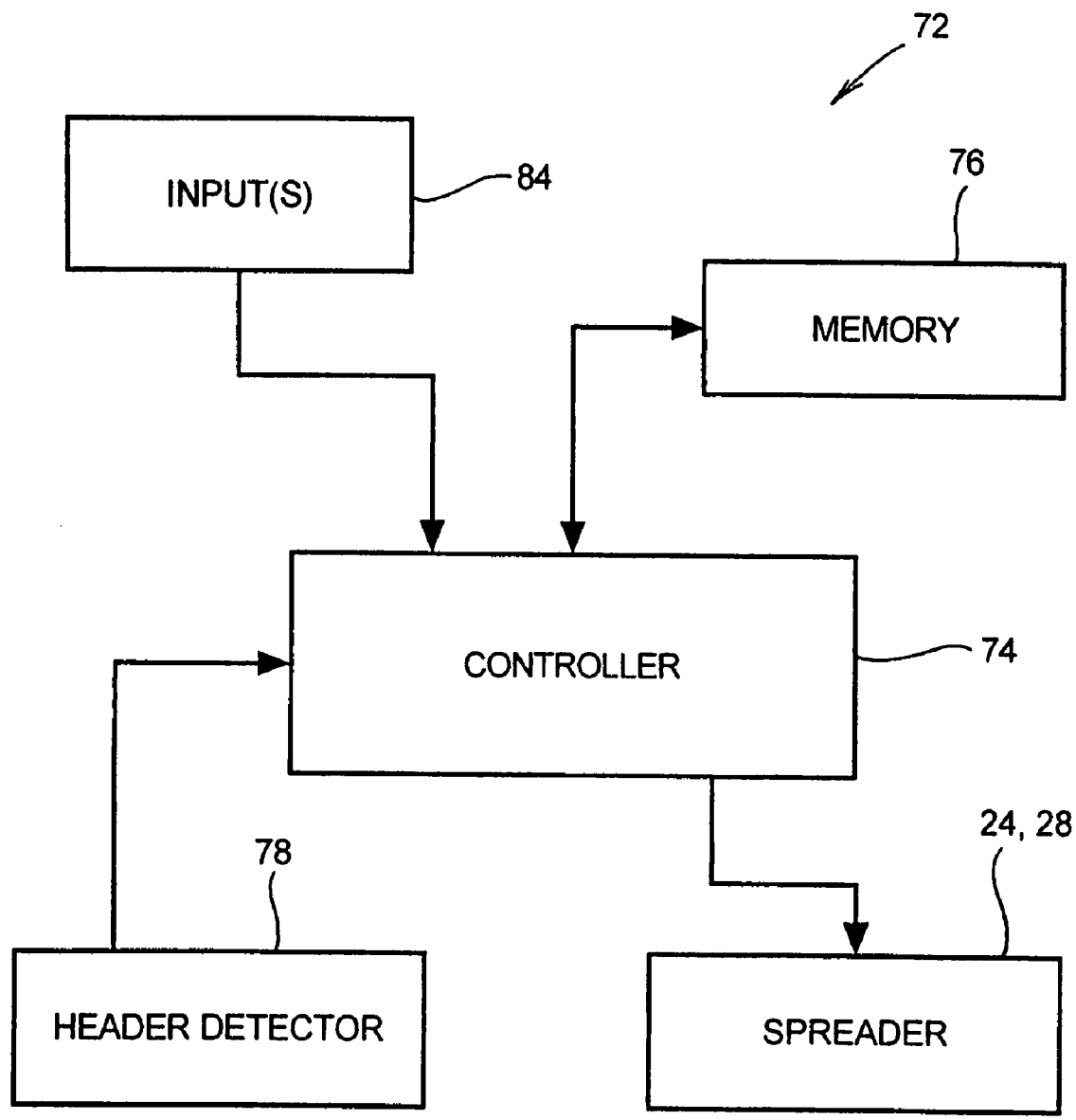
FIG. 4 is a simplified block diagram of elements of one embodiment of apparatus of the invention.

Referring also to FIG. 4, the present invention resides in apparatus 72 and a method for automatically recognizing a header, for instance, but not limited to, any of headers 32, 32A, 34 and 34A, connected to a harvesting machine, such as combine 20, and setting operating and adjustment parameters of a spreader, such as spreader 24 or spreader 28, for use with the header. Advantageously, the invention can also be configured for accommodating adjustments for different crops, different crop conditions, and for environmental conditions, or responsive to remote inputs, for improving or fine tuning crop residue spreading and distribution. Apparatus 72 includes a processor based controller 72, which can be, for instance, a commercially available microprocessor operated controller commonly used for controlling systems of work machines such as combine 20, and connected via a suitable conductive path with a memory 76 for retrieving information therefrom. Memory 76 contains stored information representative of predetermined spreader settings for at least one actuator, such as one or more actuators 50 discussed above, and/or one or more control devices, such as control device 62, for at least one header connectable to the harvesting machine, and more preferably, at least two headers, such as, but not limited to, a grain header such as header 32 and/or header 32A, and a corn or maize header such as header 34 and/or header 34A. Essentially, such stored information will typically include, for instance, a range of positional information such as a length of extension for one or more actuators 50, for positioning vanes 48 of spreader 24 or various of the distributors and/or guides 52, 54, 56 and 58 of spreader 28; and/or a range of motor speed using control device 62, for achieving a particular crop residue deposition pattern width, e.g., one of widths C, D, E or F, which corresponds to a width of the installed header, e.g., 32, 32A, 34 or 34A, and other conditions, principal among which will be crop type. The actual position of the actuators, vanes, distributors and guides, and the actual motor or impeller speed, can be determined using a suitable feedback device or devices, such as a position or speed sensor, respectively, in the conventional and well-known manner, which position or speed can be inputted to controller 74.

Apparatus 72 includes a detector element, denoted generally by a block 78 connected to controller 74 and operable for automatically identifying a header connected to the machine and outputting a signal or information representative thereof to controller 74, to enable controller 74 to select and retrieve the appropriate spreader setting information for that header. As one example, detector element 78, can include, a plug or receptacle on combine 20 which is connectable to a device, denoted generally by a block 80, which can be, for instance, a mating plug or receptacle on a header when the header is connected to the combine, and operable for automatically identifying the header. For instance, detector element 78 can include a connector containing series of switches, the states of which are changed in different predetermined manners by connection of different mating connectors thereto, wherein each different width and/or type of header has a different mating connector which changes the state of the switches in the predetermined manner for that header. As another example, a header could include a memory device, denoted generally by block 82 including stored information identifying the header, which information is provided to controller 74 upon connection of the header to the combine. Such a memory device can include a commercially available EPROM, flash memory or other suitable device. Device 82 can also include RFID or other circuitry for air-borne communication, which can be activated by proximity or connection of the header to a combine, for inputting the identifying information to controller 74. Additionally, device 82 can be configured so as to encompass or contain all or some of the stored spreader setting information noted above as being contained in memory 76.

Apparatus 72 additionally preferably includes one or more input devices 84, preferably including an operator usable input device 84 preferably located in an operator cab 86 of combine 20, and at least one external input device 84 for inputting environmental conditions such as wind direction and speed, connected to controller 74. Operator usable input device 84 can include, for instance, a switch or touch screen, and is usable by an operator for inputting commands to controller 74 for inputting information, such as crop type and/or conditions, and for adjusting the spreader setting or settings. This feature can allow, for instance, selecting a crop to be harvested from a stored list of crops harvestable by a particular header. As an example, for a grain header such as header 32 or header 32A, this can involve selecting from a list of crop types, such as wheat, rice and other grasses, legumes such as soybeans, canola, etc. This feature also allows changing or adapting the pattern and/or width of the crop residue deposition during operation of the header or prior thereto, for accommodating operator preferences, and changes in environmental conditions such as wind, and other conditions such as crop moisture content, volume and the like. On board locations for devices 84 can include, but are not limited to, on the roof of the operator cab, and on the end of a header, as illustrated. Still other input devices can include, for instance, a remote input device 84A. Examples of contemplated remote input devices 84A include a radio frequency device or network which broadcasts environmental data, such as weather data, from a source such as the National Weather Service available in the United States, a local weather station, or an on-site weather station; or a wireless data signal, for instance, such as sent via satellite, such as a GPS guidance signal, or a geographic information system (GIS) signal, which could provide, for instance, information such as the real-time information relating to proximity of the machine to a geographic feature such as a field boundary or road, and onto which it is not desired to distribute crop residue or for which the spreading characteristics are desired to be adjusted. Controller 74 can be connected to or include an appropriate commercially available antenna or other receiver (not shown) for receiving the signals from a remote input device, in the well known manner.

Figure 5:
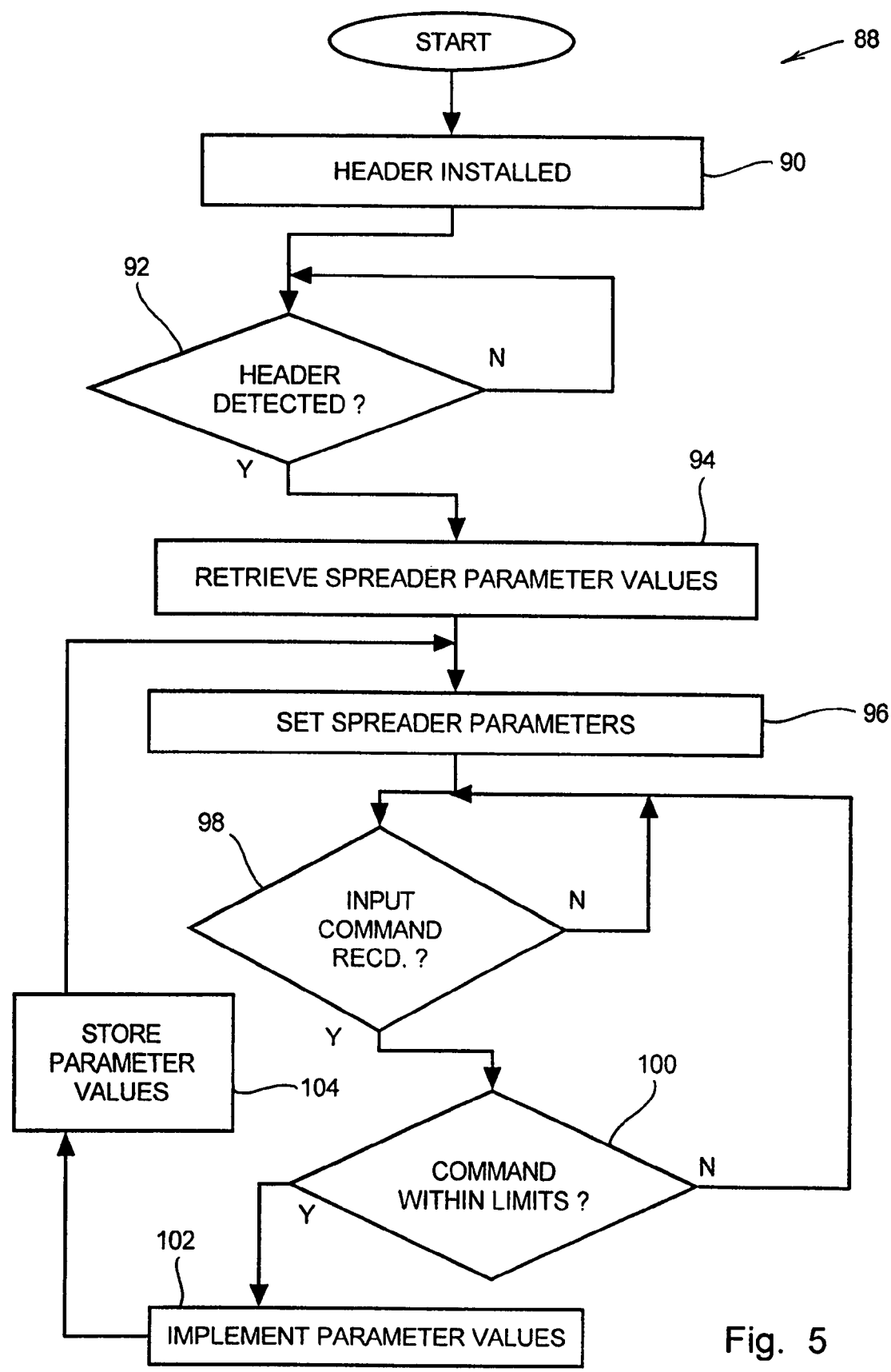
FIG. 5 is a high-level flow diagram illustrating steps of a method of the invention.

Referring also to FIG. 5, a high level flow diagram 88 including steps of an exemplary method of the invention is shown. Referring to diagram 88, in block 90 a header, such as any of headers 32, 32A, 33 and 33A, is installed. As explained above, responsively, detector element 78 will change state or otherwise provide information to controller 74, and controller 74 is programmed to recognize or identify the header, as denoted by decision block 92. Responsive to the identification of the header, controller 74 will retrieve the appropriate stored spreader parameter value or values from memory 76 for the identified header, as denoted by block 94. At this time, or at another time during the initial setting of the spreader, for some headers or all headers, controller 74 can be programmed to prompt the user to input information, for instance, regarding crop type, condition, etc. Controller 74 will then set the spreader parameter or parameters to a stored value or values, as denoted by block 96. As explained above, this will entail outputting control signals to the appropriate actuator or actuators 50, for positioning one or more elements of the spreader, such as, but not limited to, vanes 48 of spreader 24, or distributors 52 and/or 54 and/or guides 56 and/or 58 of spreader 28, and/or to a control device 62, for setting the spreader for the identified header, and, if appropriate, the selected crop.

Additionally, if any additional inputted commands are received, for instance, as inputted by an operator using input device 84, or as received from an environmental input device 84 such as a wind direction and/or speed sensor, and/or as received from a remote input device 84A, controller 74 is preferably programmed for automatically comparing values thereof to at least one predetermined limit therefor, for instance a maxima and a minima limit, as denoted by decision blocks 98 and 100. If the inputs are within the limits, controller 74 will implement the commands, and store them in memory 76 or another location, as denoted by blocks 102 and 104. Controller 74 is also preferably programmed to automatically store in the memory a value representative of at least a last of the inputted commands, and then to subsequently automatically adjust the spreader to the last command, such as when the spreader and/or the harvesting machine has been turned off and is restarted.

Thus, as an advantage of the apparatus and method of the present invention, the settable spreader setting or settings for a particular header installed on a harvesting machine will be automatically made, with only an operator input for crop type, if appropriate. And, via an appropriate input device 84, the operator, can make further adjustments to the settings, and/or responsive to inputs from an input device 84 and/or a remote input device 84A, other adjustments can be made, preferably within predetermined limits, at any time during operation of the machine. As a further advantage, the controller of the invention is automatically operable for setting the spreader to the last made adjustments upon the machine being turned off and back on.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. Apparatus for controlling settings of an adjustable crop residue spreader of an agricultural harvesting machine, comprising:
    a memory containing information representative of predetermined spreader settings for at least one header connectable to the harvesting machine;
    a detector element operable for automatically identifying a header connected to the machine and outputting a signal representative thereof;
    a controller automatically operable for receiving the signal outputted by the detector element and retrieving the information representative of the predetermined spreader settings for the header connected to the machine from the memory, and responsively controlling a crop residue spreader connected to the machine as a function of the retrieved information; and
    an input device connected to the controller and usable for inputting commands to the controller for adjusting the spreader as a function of the inputted commands,
    wherein the controller is automatically operable for storing a value in the memory representative of at least a last of the inputted commands,
    further wherein the controller is automatically operable for adjusting the spreader as a function of the stored values representative of the last of the inputted commands after shutdown and upon subsequent commencement of operation of the spreader.

2. Apparatus of claim 1, wherein the crop residue spreader connected to the machine, the crop residue spreader including at least one actuator controllably operable for adjusting a setting of the spreader, and the controller being connected to the actuator and operable for responsively controlling the actuator as a function of the retrieved information.

3. Apparatus of claim 1, wherein the memory contains predetermined information representative of spreader settings for at least two headers connectable to the harvesting machine, respectively.

4. Apparatus of claim 1, wherein the controller is automatically operable for comparing values of the inputted commands to at least one limit therefor, and adjusting the spreader as a function of the inputted commands only when the values are within the at least one limit.

5. Apparatus of claim 1, wherein the input device is a remote input device.

6. Apparatus of claim 1, wherein the crop residue spreader connected to the machine and including an adjustable spreader board, and at least one actuator connected to the spreader board and controllably operable for adjusting a position thereof for effecting a change in crop residue distribution, the controller being connected in operative control of the at least one actuator and operable for responsively controlling the actuator as a function of the retrieved information for adjusting a position of the spreader board.

7. Apparatus of claim 1, wherein the crop residue spreader connected to the machine and including an adjustable element, and an actuator connected to the adjustable element and controllably operable for adjusting a position thereof for effecting a change in crop residue distribution, the controller being connected in operative control of the actuator and operable for responsively controlling the actuator as a function of the retrieved information for adjusting a position of the adjustable element.

8. Apparatus of claim 1, wherein the crop residue spreader connected to the machine and including at least one motor controllably operable for rotating an impeller for propelling crop residue from the spreader, and a control device connected to the motor and controllably operable for varying a speed of operation thereof, the controller being connected to the control device and operable for responsively controlling the control device as a function of the retrieved information for controlling a speed of the motor.

9. A method for controlling settings of an adjustable crop residue spreader of an agricultural harvesting machine, comprising steps of:
    providing a memory containing information representative of predetermined spreader settings for at least one header connectable to the harvesting machine;
    providing a detector element operable for automatically identifying a header connected to the machine and outputting information representative thereof;
    providing a controller connected to the detector element for receiving the information outputted thereby and retrieving the information representative of the predetermined spreader settings for the header connected to the machine from the memory, and responsively controlling a crop residue spreader connected to the machine as a function of the retrieved information;
    providing an input device connected to the controller and operable for inputting commands thereto for adjusting the spreader;
    adjusting the spreader as a function of the inputted commands;
    automatically storing a value in the memory representative of at least a last of the inputted commands; and
    comprising a further step of automatically adjusting the spreader as a function of the stored values representative of the last of the inputted commands after shutdown and upon subsequent commencement of operation of the spreader.

10. The method of claim 9, further comprising a step of:
providing the crop residue spreader connected to the machine, the crop residue spreader including at least one actuator controllably operable by the controller for adjusting a setting of the spreader.

11. The method of claim 9, wherein the memory contains information representative of predetermined spreader settings for at least two headers connectable to the harvesting machine, respectively.

12. The method of claim 9, comprising a step of automatically comparing values of the inputted commands to at least one limit therefor, and adjusting the spreader as a function of the inputted commands only when the values are within the at least one limit.

13. The method of claim 9, wherein the input device is a remote input device.

14. The method of claim 9, comprising further steps of:
providing the crop residue spreader connected to the machine and including an adjustable spreader board; and
providing an actuator connected to the spreader board and controllably operable for adjusting a position thereof for effecting a change in crop residue distribution, the controller being connected in operative control at the actuator for automatically controlling the actuator as a function of the retrieved information for adjusting a position of the spreader board.

15. The method of claim 9, further comprising steps of:
providing the crop residue spreader connected to the machine and including an adjustable element;
providing an actuator connected to the deflector and controllably operable for adjusting a position thereof for effecting a change in crop residue distribution, the controller being connected in operative control of the actuator for automatically controlling the actuator as a function of the retrieved information for adjusting a position of the deflector.

* * * * *